United States Patent [19]

Morishita

[11] 4,398,140
[45] Aug. 9, 1983

[54] CONTROL APPARATUS FOR CHARGING GENERATOR

[75] Inventor: Mitsuharu Morishita, Himeji, Japan

[73] Assignee: Mitsubishi Denki Kabushiki Kaisha, Tokyo, Japan

[21] Appl. No.: 364,628

[22] Filed: Apr. 2, 1982

Related U.S. Application Data

[63] Continuation of Ser. No. 175,695, Aug. 6, 1980, abandoned.

[30] Foreign Application Priority Data

Sep. 18, 1979 [JP] Japan ................................ 54-129855

[51] Int. Cl.³ .............................................. H02J 7/14
[52] U.S. Cl. ......................................... 320/36; 322/34
[58] Field of Search ...................... 320/35, 36; 322/33, 322/34

[56] References Cited

U.S. PATENT DOCUMENTS 3,350,618 10/1967 Barney et al. ..................... 320/35 X
3,609,505 9/1971 Harland, Jr. et al. ............. 322/33 X
3,663,946 5/1972 Iwaki ................................. 322/33 X Primary Examiner—Reinhard J. Eisenzopf
Attorney, Agent, or Firm—Oblon, Fisher, Spivak, McClelland & Maier

[57] ABSTRACT

A control apparatus for a charging generator for charging a battery comprises a first temperature detecting element having a positive temperature coefficient which detects the variation of ambient temperature of a voltage regulator to impart a negative temperature gradient to the voltage adjusting characteristic of the voltage regulator and a second temperature detecting element having a negative temperature coefficient which detects the self-heating of the generator or the voltage regulator during operation to impart a positive temperature gradient to the voltage adjusting characteristic so as to control the output voltage of the generator. This control apparatus has a dynamic characteristic permitting the adjusted voltage to increase so as to compensate the voltage drop in the external load characteristic; thus an excellent charging characteristic of the battery can be attained.

1 Claim, 6 Drawing Figures

FIG. 1 PRIOR ART
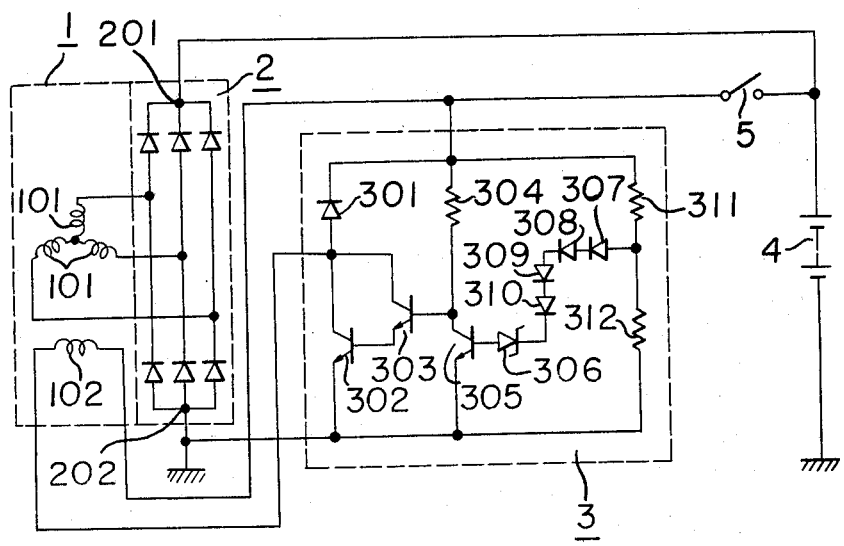
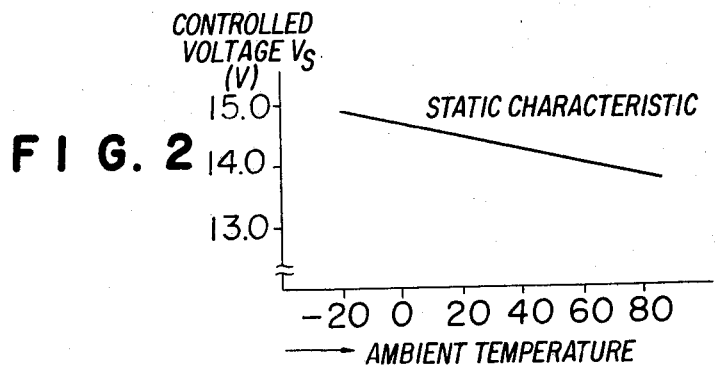
FIG. 2
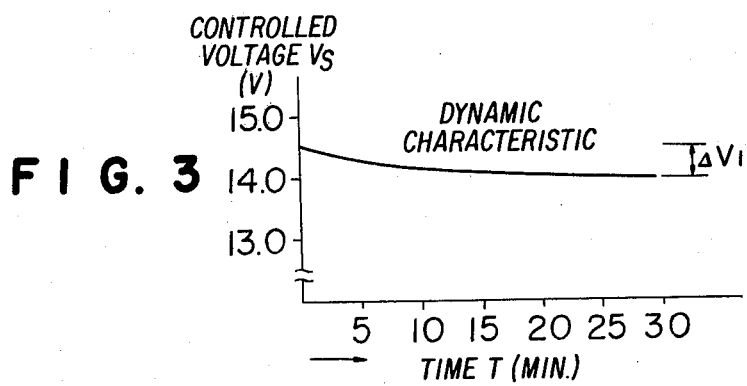
FIG. 3
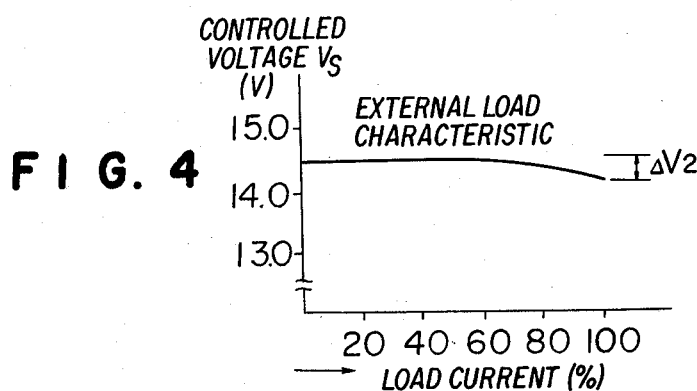
FIG. 4

CONTROL APPARATUS FOR CHARGING GENERATOR

This is a continuation of application Ser. No. 175,695, filed Aug. 6, 1980, now abandoned.

BACKGROUND OF THE INVENTION

1. Field of the Invention

The present invention relates to a control apparatus for a charging generator for charging a battery by controlling the output voltage of the generator in a predetermined value.

2. Description of the Prior Arts

FIG. 1 shows a diagram of the conventional apparatus of this type and FIGS. 2, 3 and 4 show characteristic curves of the apparatus. In FIG. 1, an alternating current generator (1) equipped in a vehicle (not shown) and actuated by an internal combustion engine (not shown) has armature coils (101) connected having the three phase star connection and a field coil (102). A full-wave rectifying means (2) is provided to rectify the AC output of the generator (1) and has a rectified current output terminal (201) at the positive side and a rectified current output terminal (202) at the negative side. A voltage regulator (3) for controlling the output voltage of the generator (1) in a predetermined value comprises a surge absorbing diode (301) connected at both ends of the field coil (102); output transistors (302), (303) connected each other into the Darlington connection so as to turn-on or off the field current of the field coil (102); a resistor (304) connected in the base circuit of the transistors (302), (303); a control transistor (305) for turning on or off the output transistors (302), (303); a Zener diode (306) which detects the output voltage of the generator (1) to turn-on when the output voltage reaches a predetermined value; diodes for detecting temperature (307), (308), (309), (310) which are connected in series in the forward direction to the Zener diode (306) to give a negative temperature gradient for the predetermined value; resistors (311), (312) connected in series between the rectified current output terminal (201) at the positive side and the rectified current output terminal (202) at the negative side to form a shunt circuit for voltage; a battery (4) and a key switch (5).

The operation of the conventional apparatus having the structure will be described.

When the key switch (5) is closed to actuate the internal combustion engine, the base current is fed from the battery (4) through the key switch (5) and the resistor (304) to the output transistors (302), (303) to turn-on the latters. Accordingly, the field current is fed from the battery through the key switch (5) to the field coil (102) to produce the field magnetomotive force. When the engine is started to drive the generator (1) in this condition, an AC output is induced in the armature coil (101) depending on the revolution speed of the generator. The AC output is subject to full-wave rectification by the full-wave rectifying means (2). When the voltage of the rectified output is lower than the predetermined value, the Zener diode (306) holds the turn-off condition since the potential at the shunt point of the shunt circuit comprising the resistors (311), (312) is sufficiently low so that the output voltage of the generator (1) increases depending upon the increase of the revolution speed. When the revolution speed of the generator (1) further increases and the output voltage exceeds the predetermined value, the potential at the shunt point of the shunt circuit is also high whereby the Zener diode (306) is turned on to feed the base current to the control transistor (305) through the diodes (307), (308), (309), (310) and the Zener diode (306) thereby turning on the control transistor (305). When the control transistor (305) is turned on, the output transistors (302), (303) are turned off to de-energize the field coil (102) so that the output voltage of the generator (1) decreases.

When the output voltage decreases lower than the predetermined value, the Zener diode (306) and the transistor (305) are turned off again and the transistors (302), (303) are turned on to actuate the field coil (102) so that the output voltage of the generator (1) increases again. The operation described above is repeated to control the output voltage of the generator (1) in the predetermined value. Thus the battery (4) is charged in the predetermined value by the controlled voltage.

FIG. 2 shows a static characteristic curve depicting the variation of a controlled voltage to that of the ambient temperature of the voltage regulator (3) and the generator (1). As shown in the figure, the controlled voltage tends to decrease linearly depending upon the increase of the ambient temperature because the rate of the voltage drop in the forward direction of the temperature detecting diodes (307), (308), (309), (310) is respectively $-2$ mv/°C.

FIG. 3 shows a dynamic characteristic curve depicting the variation of the controlled voltage to the operating time of the conventional apparatus shown in FIG. 1, that is, the variation of the controlled voltage to the operating time when the generator (1) is operated at a constant revolution speed under the condition passing load current by the connecting of a load (not shown). As shown in the figure, the self-heating occurs in the generator (1) and the voltage regulator (3) since the field current increases in substantially proportional to the load current. Usually, the temperature detecting diodes (307), (308), (309), (310) and the output transistors (302), (303) are placed in a position subject to the affection of heat and the self-heating of the generator (1) affects to the voltage regulator (3) through the heat conduction. Accordingly, the temperature of the temperature detecting diodes (310), (308), (309), (310) increase depending upon time and the controlled voltage is decreased by $\Delta V_1$ to be saturated in accordance with the characteristic curve shown in FIG. 3.

FIG. 4 shows an external load characteristic curve depicting the variation of the controlled voltage to that of the load current wherein the controlled voltage is usually decreased by $\Delta V_2$ depending upon the increasing of the load current.

In the conventional apparatus having the static characteristic shown in FIG. 2, when the generator is operated under a heavy load, the controlled voltage decreases by $\Delta V_1$ regardless of the ambient temperature as shown in FIG. 3. This is disadvantageous in charging the battery (4). Furthermore, when there are many loads, the controlled voltage decreases by $\Delta V_2$ as shown in FIG. 4 and after all, the controlled voltage decreases by $\Delta V_1 + \Delta V_2$ whereby the charging characteristic of the battery (4) becomes inferior.

SUMMARY OF THE INVENTION

It is an object of the invention to overcome the disadvantage of the conventional apparatus and to provide a control apparatus for a charging generator which has a dynamic characteristic for increasing the controlled voltage to compensate the voltage drop caused by the external load characteristic so that an excellent charging characteristic for a battery can be obtained, by providing a first temperature detecting element thermally insulated from the self-heating of a generator (1) and a voltage regulator, said first temperature detecting element having a positive temperature coefficient which detects the variation of the ambient temperature to impart a negative temperature gradient to the voltage adjusting characteristic of a voltage regulator and a second temperature detecting element having a negative temperature coefficient which detects the self-heating of the generator or the voltage regulator to impart a positive temperature gradient to the voltage adjusting characteristic.

BRIEF DESCRIPTION OF THE DRAWINGS

FIG. 1 is an electrical diagram of the conventional apparatus;

FIG. 2 is a diagram showing the static characteristic curve of the conventional apparatus;

FIG. 3 is a diagram showing the dynamic characteristic curve;

FIG. 4 is a diagram showing the external load characteristic curve;

DETAILED DESCRIPTION OF THE PREFERRED EMBODIMENT

Figure 5:
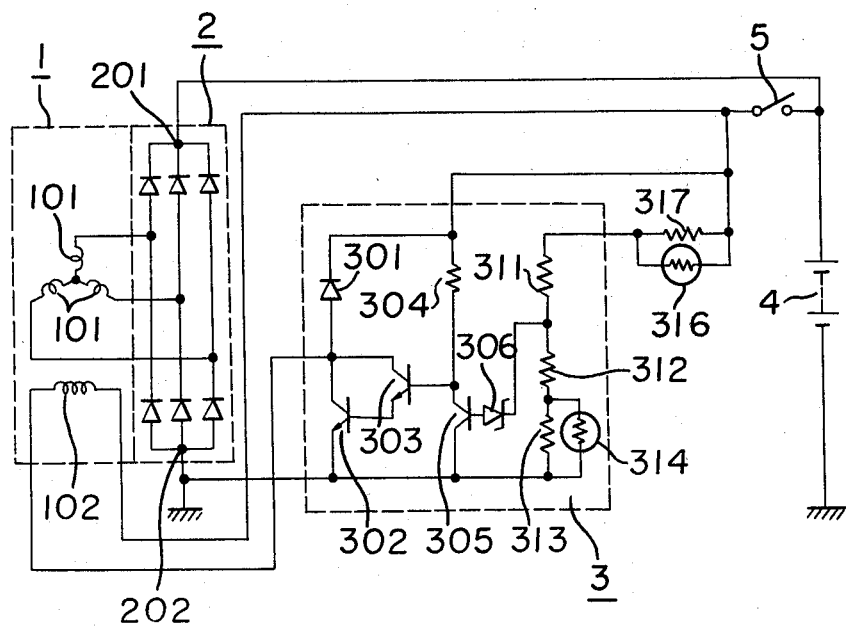
FIG. 5 is an electrical diagram of an embodiment of the present invention.

An embodiment of the present invention will be described with reference to FIGS. 5 and 6. In FIG. 5, the reference numeral (313) designates a resistor connected in series to a shunt resistor (312); (314) designates a thermistor as a second temperature detecting element having a negative temperature coefficient which is connected in parallel to the resistor (313) to detect the ambient temperature of the charging generator (1) or the voltage regulator (3); (317) designates a resistor which is thermally isolated from the voltage regulator (3) and the generator (1) and is connected in series to the shunt resistor (311); (316) designates a thermistor as a first temperature detecting element having a positive temperature coefficient which is connected in parallel to the resistor (317) and is thermally isolated from the voltage regulator (3) and the generator (1) similar to the resistor (317).

Figure 6:
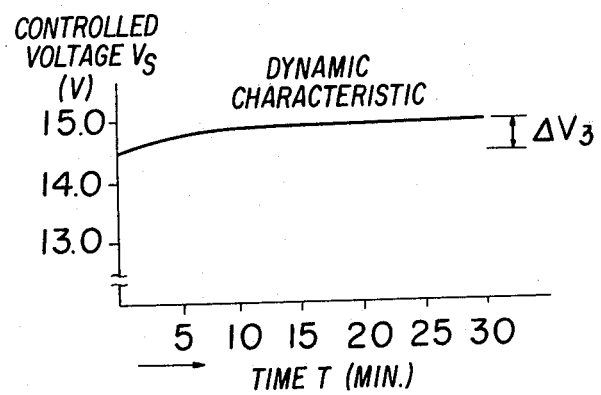
FIG. 6 is a diagram showing the dynamic characteristic curve of the present invention.

FIG. 6 is a dynamic characteristic curve showing the variation of the controlled voltage to the operation time of the apparatus of the present invention shown in FIG. 5.

In this embodiment having the structure described above, the fundamental operation for controlling the output voltage of the generator is substantially the same as that of the conventional apparatus shown in FIG. 1. Accordingly, the description is omitted. The static characteristic (FIG. 2) and the external load characteristic (FIG. 4) are also the same as the conventional one. However, the dynamic characteristic showing the variation of the controlled voltage to the operating time is different from that of the conventional apparatus as follow. As shown in FIG. 6, the thermistor (316) as the first temperature detecting element keeps constant because the ambient temperature does not change. On the other hand, the thermister (314) as the second temperature detecting element thermally coupled to the voltage regulator (3) decreases in resistance by the self-heating of the generator (1) and the voltage regulator (3) which increases depending upon the operating time. The potential at the junction of the shunt resistors (311), (312) is, therefore, decreased to prolong time for the turning-on of the Zener diode (306). As a result, the energizing time for the field coil (102) is prolonged whereby the controlled voltage is increased by $\Delta V_3$ to be saturated.

When the load for the generator (1) is large, the variation of the adjusting value to the increment of the load current, that is, the external load characteristic is decreased by the controlled voltage value $\Delta V_2$ as shown in FIG. 4, at the same time the increase of the controlled voltage $\Delta V_3$ occurs depending upon the temperature rise in the generator (1) and the voltage regulator (3) during a certain time as shown in FIG. 6 so that the decrement of controlled voltage by the external load can be compensated to improve the charging characteristic of the battery (4).

As described above, in the present invention, there are provided the first temperature detecting element having the positive temperature coefficient which detects the variation of the ambient temperature to impart the negative temperature gradient to the voltage adjusting characteristic of the voltage regulator and which is placed so as to be isolate thermally from the self-heating of the generator (1) and the voltage regulator, and the second temperature detecting element having the negative temperature coefficient which detects the self-heating of the generator or the voltage regulator to impart the positive temperature gradient to the voltage adjusting characteristic. This provision enables the increase of controlled voltage on the dynamic characteristic to compensate the voltage drop by the external load characteristic, thus an excellent charging characteristic of the battery can be attained.

I claim:

1. In a control apparatus for a charging generator comprising a battery charged by a rectified output of an AC generator having a field coil and a voltage regulator for controlling a field current passing through the field coil to control the output voltage of the generator in a predetermined value, an improvement which comprises;

a parallel combination of a first resistor and a first thermistor having a positive temperature coefficient which detects the variation of ambient temperature of the voltage regulator to impart a negative temperature gradient to the voltage adjusting characteristic of the voltage regulator, said first thermistor being thermally isolated from the generator and the voltage regulator, and said voltage regulator comprising a series combination comprising second, third and fourth resistors connected to said parallel combination and a second thermistor connected in parallel with said fourth resistor and having a negative temperature coefficient which detects the self-heating of the generator or the voltage regulator during the operation to impart a positive temperature gradient to the voltage adjusting characteristic.

* * * * *